(12) United States Patent
Wegerich et al.

(10) Patent No.: US 7,941,701 B2
(45) Date of Patent: May 10, 2011

(54) FUZZY CLASSIFICATION APPROACH TO FAULT PATTERN MATCHING

(75) Inventors: Stephan W. Wegerich, Geneva, IL (US); Chad Stoecker, Downers Grove, IL (US); Richard Marcell, Naperville, IL (US)

(73) Assignee: SmartSignal Corporation, Lisle, IL (US)

( * ) Notice: Subject to any disclaimer, the term of this patent is extended or adjusted under 35 U.S.C. 154(b) by 319 days.

(21) Appl. No.: 12/184,575

(22) Filed: Aug. 1, 2008

(65) Prior Publication Data

US 2009/0037772 A1  Feb. 5, 2009

Related U.S. Application Data

(60) Provisional application No. 60/953,800, filed on Aug. 3, 2007.

(51) Int. Cl.
G06F 11/00 (2006.01)

(52) U.S. Cl. .......................................................... 714/26

(58) Field of Classification Search ...................... 714/26
See application file for complete search history.

(56) References Cited

U.S. PATENT DOCUMENTS

| | | | |
|---|---|---|---|
| 4,402,054 A | 8/1983 | Osborne et al. | |
| 5,333,240 A | 7/1994 | Matsumoto et al. | |
| 5,473,532 A | 12/1995 | Unno et al. | |
| 5,921,099 A * | 7/1999 | Lee | 62/228.4 |
| 6,181,975 B1 | 1/2001 | Gross et al. | |
| 6,424,958 B1 * | 7/2002 | Pappalardo et al. | 706/8 |
| 6,826,552 B1 * | 11/2004 | Grosser et al. | 706/47 |
| 6,839,660 B2 | 1/2005 | Eryurek et al. | |
| 6,898,554 B2 * | 5/2005 | Jaw et al. | 702/185 |
| 7,089,154 B2 | 8/2006 | Rasmussen et al. | |
| 7,142,990 B2 | 11/2006 | Bouse et al. | |
| 2002/0183971 A1 | 12/2002 | Wegerich et al. | |
| 2004/0088093 A1 * | 5/2004 | Yao et al. | 701/44 |
| 2005/0021212 A1 * | 1/2005 | Gayme et al. | 701/99 |
| 2005/0210337 A1 * | 9/2005 | Chester et al. | 714/47 |
| 2006/0036403 A1 * | 2/2006 | Wegerich et al. | 702/183 |
| 2006/0059926 A1 * | 3/2006 | McCormick et al. | 62/129 |
| 2009/0043405 A1 * | 2/2009 | Chester et al. | 700/28 |
| 2009/0043467 A1 * | 2/2009 | Filev et al. | 701/57 |

* cited by examiner

*Primary Examiner* — Bryce P Bonzo
(74) *Attorney, Agent, or Firm* — Fitch, Even, Tabin & Flannery (57) ABSTRACT

A method and apparatus are provided for diagnosing faults in a monitored system. Estimates of parameter data are generated from the system with reference parameter data characteristic of known behavior of the system. The generated estimates of the parameter data are compared with measured parameter data. A residual is determined for each of the parameters based on a relationship between the estimates of the parameter data and the measured parameter data. A fuzzy classification rule is implemented to determine a likelihood that a predetermined fault exists by using residuals for parameters used to indicate the existence of the predetermined fault.

15 Claims, 9 Drawing Sheets

Prior Art

FUZZY CLASSIFICATION APPROACH TO FAULT PATTERN MATCHING

CROSS-REFERENCE TO RELATED APPLICATIONS

This application claims the benefit of U.S. Provisional Application No. 60/953,800, filed Aug. 3, 2007, the contents of which are hereby incorporated by reference.

TECHNICAL FIELD

The present invention relates generally to the field of early detection and diagnosis of incipient machine failure or process upset. More particularly, the invention is directed to a fuzzy classification method and system for model-based monitoring of processes and machines, and experience-based diagnostics.

BACKGROUND

A variety of new and advanced techniques have emerged in industrial process control, machine control, system surveillance, and condition based monitoring to address drawbacks of traditional sensor-threshold-based control and alarms. The traditional techniques did little more than provide responses to gross changes in individual metrics of a process or machine, often failing to provide adequate warning to prevent unexpected shutdowns, equipment damage, loss of product quality or catastrophic safety hazards.

According to one branch of the new techniques, empirical models of the monitored process or machine are used in failure detection and in control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to behave. Additionally, these approaches have the advantage that no additional instrumentation is typically needed, and sensors in place on the process or machine can be used.

An example of such an empirical surveillance system is described in U.S. Pat. No. 6,181,975 to Gross et a1., the teachings of which are incorporated herein by reference. Therein is described an empirical model using a similarity operator against a reference library of known states of the monitored process, and an estimation engine for generating estimates of current process states based on the similarity operation, coupled with a sensitive statistical hypothesis test to determine if the current process state is a normal or abnormal state. The role of the similarity operator in the above empirical surveillance system is to determine a metric of the similarity of a current set of sensor readings to any of the snapshots of sensor readings contained in the reference library. The similarity metric thusly rendered is used to generate an estimate of what the sensor readings ought to be, from a weighted composite of the reference library snapshots. The estimate can then be compared to the current readings for monitoring differences indicating incipient process upset, sensor failure or the like. Other empirical model-based monitoring systems known in the art employ neural networks to model the process or machine being monitored.

Early detection of sensor failure, process upset or machine fault are afforded in such monitoring systems by sensitive statistical tests such as the sequential probability ratio test, also described in the aforementioned patent to Gross et al. The result of such a test when applied to the residual of the difference of the actual sensor signal and estimated sensor signal, is a decision as to whether the actual and estimate signals are the same or different, with user-selectable statistical confidence. While this is useful information in itself, directing thinly stretched maintenance resources only to those process locations or machine subcomponents that evidence a change from normal, there is a need to advance monitoring to a diagnostic result, and thereby provide a likely failure mode, rather than just an alert that the signal is not behaving as normal. Coupling a sensitive early detection statistical test with an easy-to-build empirical model and providing not only early warning, but a diagnostic indication of what is the likely cause of a change, comprises an enormously valuable monitoring or control system, and is much sought after in a variety of industries currently.

Due to the inherent complexity of many processes and machines, the task of diagnosing a fault is very difficult. A great deal of effort has been spent on developing diagnostic systems. One approach to diagnosis has been to employ the use of an expert system that is a rule based system for analyzing process or machine parameters according to rules describing the dynamics of the monitored or controlled system developed by an expert. An expert system requires an intense learning process by a human expert to understand the system and to codify his knowledge into a set of rules. Thus, expert system development takes a large amount of time and resources. An expert system is not responsive to frequent design changes to a process or machine. A change in design changes the rules, which requires the expert to determine the new rules and to redesign the system.

Current systems do not, however, have the ability to utilize approximate reasoning schemes. Instead, current systems generally employ reasoning schemes precisely deduced from classical predicate logic. Accordingly, current systems have drawbacks in dealing with some types of complex problems.

SUMMARY OF THE INVENTION

The present invention provides diagnostic capabilities in a model-based monitoring system for machines and processes. A library of diagnostic conditions is provided as part of routine on-line monitoring of a machine or process via physical parameters instrumented with sensors of any type. Outputs created by the on-line monitoring are compared to the diagnostic conditions library, and if a signature of one or more diagnostic conditions is recognized in these outputs, the system provides a diagnosis of a possible impending failure mode.

In one example of the invention, the system utilizes a fuzzy logic classification approach to fault pattern matching. A system is monitored by a set of sensors and calculated variables derived from sensors. Each of the sensors provides of a measurement of something such as, for example, temperature. Calculated variables produce measurements derived from sensor measurements via a functional relationship, such as for instance, a temperature difference calculated variable which is produced by calculating the difference between measurements from two temperature sensors. The measurements for each sensor and calculated variable are compared against predicted measurements. The predicted measurements are determined based on industry knowledge of the operation of the system. If the actual measurement differs from the predicted measurement, the difference is known as a "residual" or "residual value." The residual values for each of the sensors and calculated variables are determined.

In one form, fuzzy rules for determining the presence of different types of faults possible within the system are based on residuals from the various sensors and calculated variables. In the fuzzy rule, parameters are determined based on a logical test (also referred to as a membership function) applied to a residual value. For example, a positive logical test compares the residual value to a positive threshold value. If the residual value is positive and large relative to the threshold value, then the positive logical test is concluded to be true; on the other hand, if the residual value is positive and small relative to the threshold value, then the positive condition test is concluded to be false. The power of the fuzzy positive logical test is that it can conclude partial levels of truth if the residual value is positive and near to the threshold value. There may be several parameters in a fuzzy rule. First, primary parameters are analyzed. Next, the fuzzy truth values from the primary parameters are combined. In the event that the combined primary parameters are true to a particular degree, secondary parameters are then determined. Accordingly, there is a hierarchical relationship among the parameters, whereby some are determined and analyzed before others.

Fuzzy truth values for various parameters are determined and are then combined to determine the degree of truth or likelihood that a particular fault is incipient in the monitored system. If the combined fuzzy truth value is above a first threshold, a notification is sent to certain users or analysts to indicate that a fault may occur. If the fuzzy value is greater than a second threshold that is larger than the first threshold, notifications may be sent with more urgent wording and/or to higher-level employees because the fault is more likely to occur. Any number of exceedingly larger threshold values may be used to indicate increasing likelihood that a fault is occurring.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above needs are at least partially met through provision of the method and apparatus for remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Embodiments of the invention are directed to techniques for monitoring various systems for incipient faults. For example, Similarity Based Modeling ("SBM") techniques may be utilized to predict when "assets" in a nuclear or coal power plant are likely to fail. As discussed herein, an "asset" is a term for a particular component or related group of components within a complex machinery environment, such as a power plant or oil refinery. Application of SBM technology in such an environment typically involves the use of multiple SBM models, wherein each model includes sensors and calculated variables that monitor physical parameters of an asset. SBM techniques are applicable to any type of complex system where there are a number of sensors and there is some pre-existing knowledge about the systems and the nature of faults, based on a "first principles" analysis. A "first principles" analysis refers to a set of equations governing a process that is being monitored.

According to the modeling techniques, various data from sensors disposed through a system are accumulated and analyzed. Although SBM may be utilized in the preferred embodiment, it should be appreciated that other data driven modeling techniques may alternatively be utilized, such as kernel regression. Kernel regression is a broader form of modeling that includes SBM techniques.

According to SBM techniques, various sensor and calculated variable readings are each compared against predicted values for the sensors and calculated variables. The difference between the predicted values and the actual sensor and calculated variable values is known as a "residual" or "residual value." Generally speaking, a residual value is calculated for each of the sensors and calculated variables, and then some, or all, of the residual values are analyzed to predict when a fault is likely to occur.

The teachings discussed herein provide a methodology for defining and then automatically recognizing specific equipment fault signatures based on SBM residual patterns and other supporting information. A fault signature is the anticipated effect an equipment fault has on one or more of the sensors or calculated variables used to monitor the equipment. Over a period of time, the fault signature is manifested by changes in the residuals of the sensors and calculated variables. By analyzing the residuals over time and comparing the changes in the residuals to the fault signature, the nature of an incipient fault can be predicted. The signatures are defined based on domain knowledge of the character of specific fault types. From this information, the minimum set of parameters is identified for a model to uniquely separate a set of fault patterns specific to a piece of equipment within the system. Additionally, only the most "commonly available" sets of parameters are used in some embodiments to ensure maximum compatibility with different plants in the power generation industry. The predefined fault patterns are matched in real-time using a fuzzy classification-based approach. A discussion of residuals and fault signatures is set forth in U.S. patent application Ser. No. 09/832,166, entitled "Diagnostic Systems and Methods For Predictive Condition Monitoring," the disclosure of which is incorporated by reference in its entirety herein.

Figure 1:
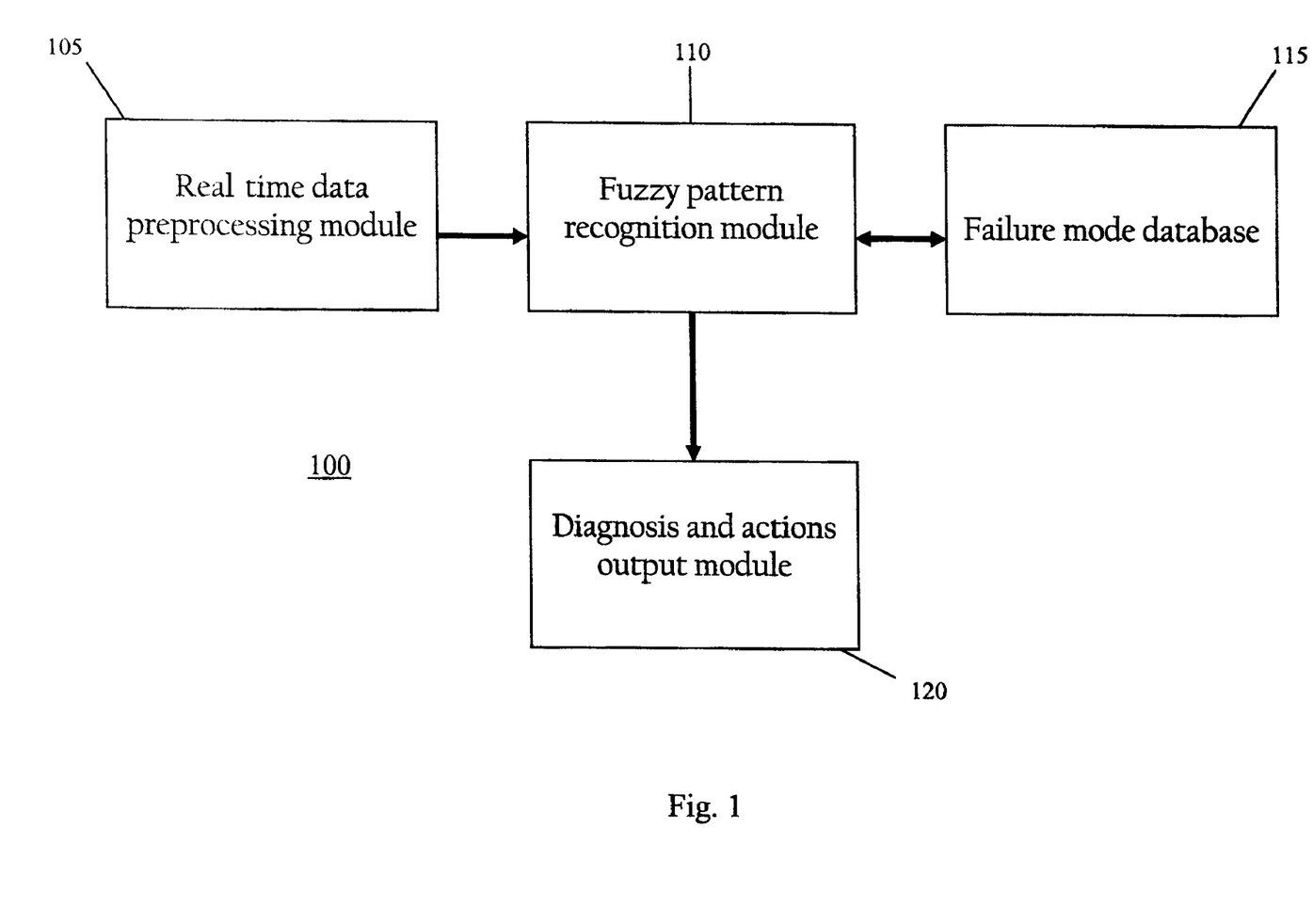
FIG. 1 illustrates a Signal Based Modeling system according to an embodiment of the invention.

FIG. 1 illustrates an SBM system 100 according to one example embodiment of the invention (also referred to herein as a fuzzy logic engine). As shown, the SBM system 100 includes a real-time data preprocessing module 105 that carries out monitoring operations on sensor data from a monitored machine or process, and outputs transformed data to a fuzzy pattern recognition module 110. The transformed data can be alert patterns, residuals, and the like, derived from normal monitoring activities of the real-time data preprocessing module 105. The fuzzy pattern recognition module 110 is in communication with a failure mode database 115, which contains signatures of transformed data and associated failure mode information. For example, if the transformed data is residual information, a fault signature can comprise a plurality of residual snapshots that are known to show themselves prior to that particular failure mode, and the associated failure mode information can comprise a description of the failure mode, a likelihood, an action plan for investigating the failure mode, and/or a corrective plan to fix the incipient failure. When signatures from the failure mode database 115 are recognized by the fuzzy pattern recognition module 110, the associated identification and any corrective actions that should be taken are output by the failure mode diagnosis and actions output module 120, which can communicate this information to a display or other user interface, or present the information in an object-based environment for automated action by a downstream control system or the like.

Figure 2:
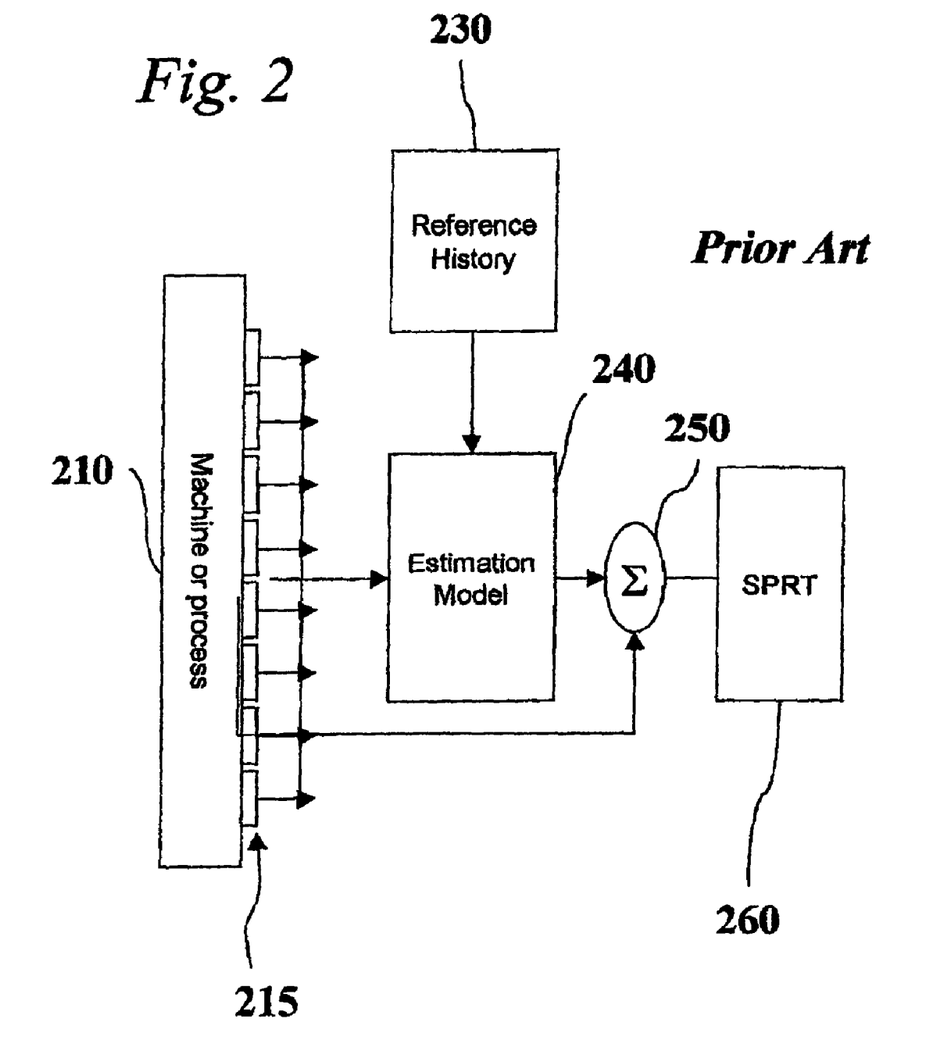
FIG. 2 illustrates an empirical model-based monitoring system according to the prior art.

The data preprocessing module 105 can be any type of monitoring system, typically model-based, and more preferably empirical model-based. This is best understood with reference to FIG. 2, which illustrates an empirical model-based monitoring system according to the prior art. Therein is shown a machine or process 210 instrumented with sensors 215 that have data acquisition means associated with them to provide the sensor data to any number of computing systems. A reference library 230 of data characterizing the known or recognized states of operation of the machine or process is provided. The reference library 230 can reside in chip memory, or can be stored on a computer disk storage device. An estimation model 240 is implemented preferably in a computer as software, and receives sensor data from sensors 215 via a network or a data acquisition board. The estimation model 240 generates estimates of the sensor values in response to receiving the real-time values from sensors 215, using the reference library 230. A differencing unit 250 receives both the estimates of the sensor values and the actual values and generates a residual for each sensor. Over successive snapshots, these residuals comprise residual signals that, as described above, should remain in the vicinity of zero with the exception of sensor and process noise, if the machine or process is operating normally (as characterized in the reference library data). A sequential probability ratio test ("SPRT") module 260 receives the residuals and generates alerts if the residuals show definitive evidence of being other than zero. Therefore, the outputs of this prior art system include residual signals and SPRT alerts (which are really indications of difference), and one of each is provided for each sensor on the machine or process that is monitored.

The fault pattern matching method discussed herein is based on concepts originating in an area of artificial intelligence called "fuzzy logic." At the heart of fuzzy logic systems is the concept of "level of truth." According to traditional binary logic systems, a statement is strictly 100% true of 100% false (i.e., 0% true). In fuzzy logic systems, on the other hand, a statement can take on any level of truth between 0% and 100%. The distribution of the level of truth is defined by a function called a "Membership Function" ("MF"). The MF is the fundamental building block for all fuzzy systems. The MF defines the transition of the level of truth from 0 to 1 (0% to 100%). There are many different ways to define an MF.

Figure 3:
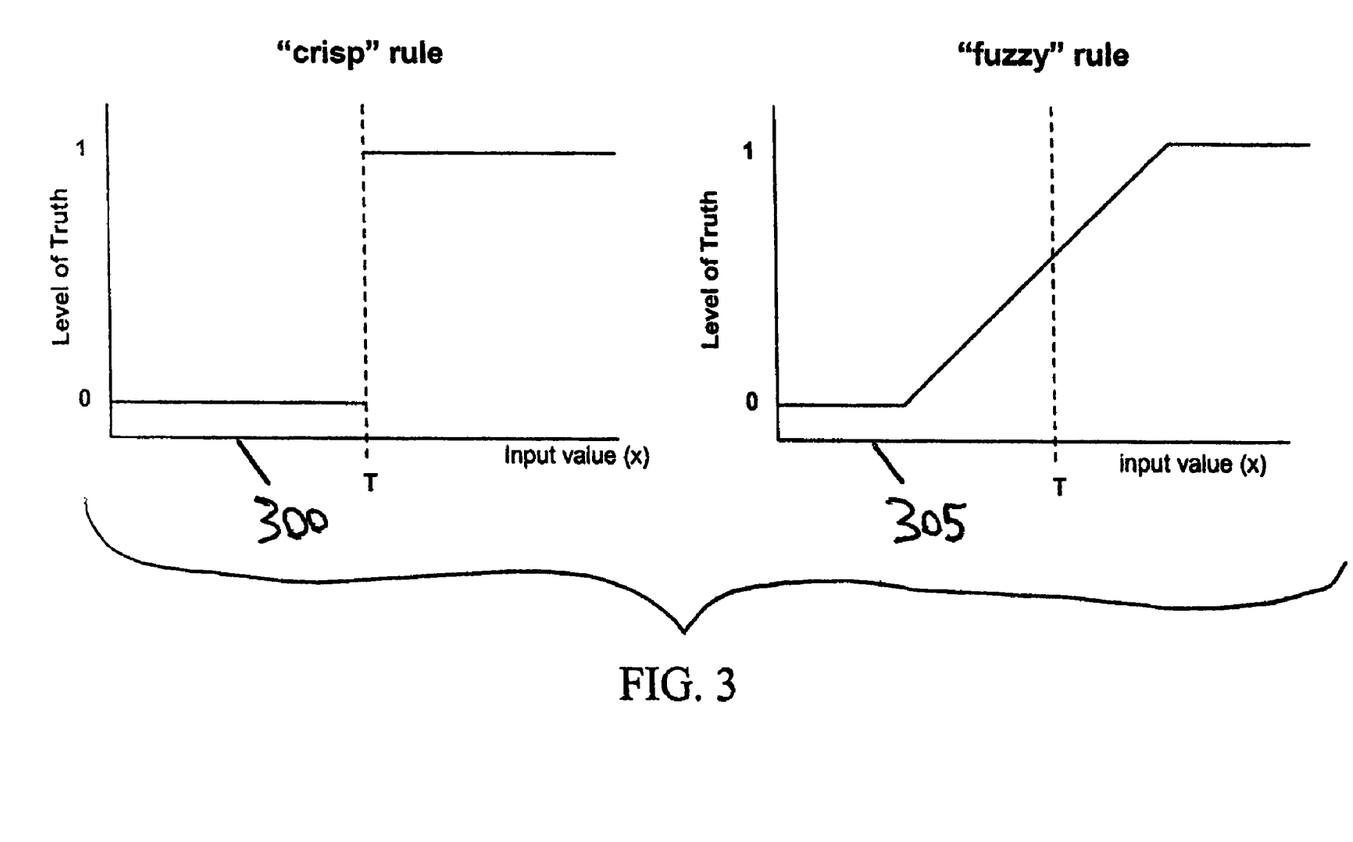
FIG. 3 illustrates a comparison of a first chart of a "crisp" logic rule and a second chart of a "fuzzy" logic rule.

FIG. 3 illustrates a comparison of a first chart 300 of a "crisp" logic rule and a second chart 305 of a "fuzzy" logic rule. The first chart 305 illustrates a crisp (i.e., binary logic) rule represented by an MF that returns a value of 0 for all input values that fall below threshold T and a value of 1 for all input values greater than or equal to threshold value T. The first chart 300 is equivalent to the logical statement: is the input value (x) greater or equal to T (i.e., is $x \geq T$)? In practice, there is no need to define an MF for a crisp rule because the binary logic statement easily represents it.

The second chart 305, on the other hand, represents a membership function for evaluating the truth of the statement: is the input value (x) large relative to T? In the second chart 305, "large" is a fuzzy term and the shape of the MF essentially represents the meaning of "large" in a mathematical sense. Although the second chart 305 illustrates a linear transition between the values 0 and 1, it should be appreciated that in some embodiments, this transition need not be linear. Moreover, the transition could also be illustrated by a non-continuous, i.e., piecemeal function.

In the context of SBM residual testing, the second chart 305 can be thought of as a means for determining the likelihood (or level of truth) that a mean shift in a residual signal is larger than a specified threshold. If a residual value is actually below the specified decision threshold, the likelihood can be non-zero that the residual meets the decision criterion. The advantage of this over a crisp rule framework is that the decision region of the threshold is more "gray," which means finding the optimal decision threshold is not as important. This may be particularly important when evaluating multi-parameter rules to recognize fault signatures. In the crisp framework illustrated by the first chart 300, every component of the antecedent of a rule would have to be 100% true for the multi-parameter rule to alert. In the fuzzy framework illustrated by the second chart 305, on the other hand, a value between 0% and 100% is always produced regardless of whether the decision threshold is completely crossed. Therefore, if one parameter out of a group is slightly below its decision threshold and the rest are above there will be a high level of truth that the fault pattern has been matched in contrast to the crisp approach in which the level of truth would be 0.

Most equipment faults manifest themselves in multiple monitored parameters. In the context of SBM, the indications of a fault appear in the residual shifts of the modeled parameters. To determine the likelihood of a fault pattern match, each parameter (or sensor) that is included in the fault pattern has a membership function (MF), which is an equation that defines the level of truth as mentioned above and explained in more detail below. In the present case, a set of membership functions are developed that cover a number of possible different residual shifts (i.e., positive shift, negative shift, no shift, and so forth also explained below). It is determined which MF (positive shift, negative shift, etc.) represents the expected residual shift for each included parameter to form the fault pattern. To calculate the likelihood of a fault pattern match, each residual that corresponds to a parameter included in the fault pattern is then entered in the corresponding MF for that parameter to calculate an output. The outputs from each of the relevant membership functions are then combined to produce scalar likelihood values. This combination establishes a multi-parameter (residual) rule (i.e., a "fuzzy classification rule") that includes at least one membership function. There are many ways to combine the individual membership outputs, the simplest are the fuzzy AND and OR operators. In fuzzy logic these are defined as the minimum and maximum respectively. Another approach is to use a weighted average of the outputs, in which case the fuzzy system is more of a fuzzy nearest neighbor classifier. The weighted average approach assigns a weight to each of the membership outputs controlling the contribution to the overall likelihood calculation. The system described herein utilizes the weighted average approach (in some cases the weights are the same, which results in straight averaging).

The following example illustrates the multi-parameter fuzzy rule evaluation process. Table 1 defines the residual fault signature for Fault Type I. There are 4 sensors that contribute to the fault pattern. In this example all of the residuals have a nominal range of −1 to 1. If the current set of residual values is Sensor A=−0.55, Sensor B=1.2, Sensor C=−0.8 and Sensor D=−0.45 then calculating the likelihood of matching fault type I proceeds as follows.

TABLE 1

Residual fault signature
Residual Fault Signature - Fault Type I

| Parameter | Sensor A | Sensor B | Sensor C | Sensor D |
|---|---|---|---|---|
| Residual Shift | NEG | POS | NEG | NEG |

Figure 4:
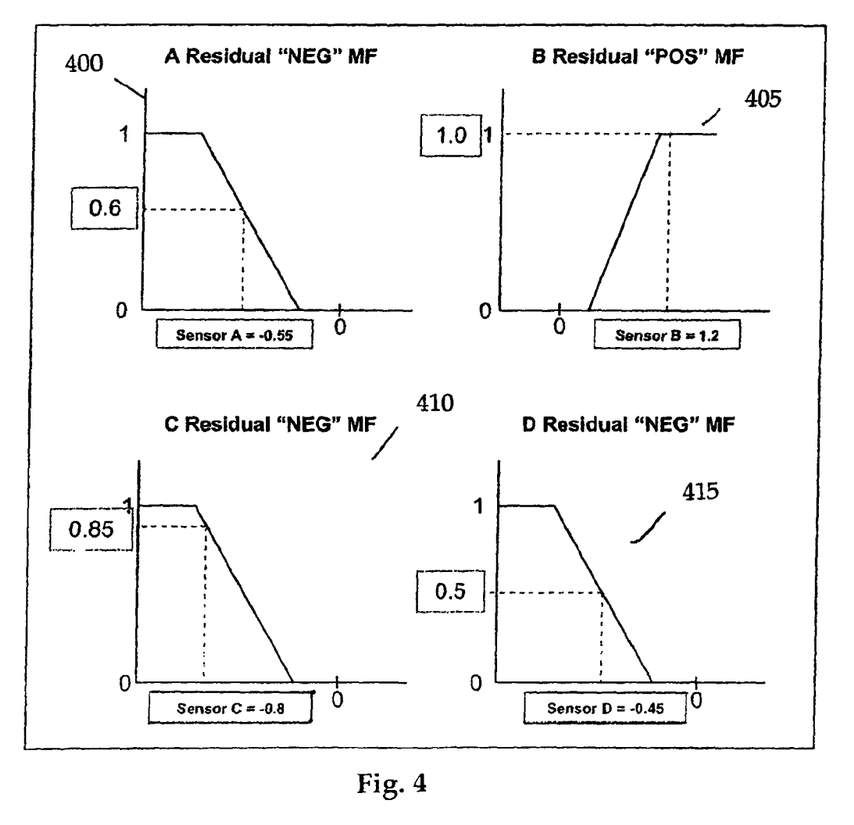
FIG. 4 illustrates the membership function definitions for the fault pattern according to an embodiment of the invention.

FIG. 4 illustrates the membership function definitions for the fault pattern according to an embodiment of the invention. FIG. 4 illustrates a negative residual shift in sensor A in a first chart 400, a positive residual shift in sensor B in a second chart 405, a negative residual shift in sensor C in a third chart 410, and a negative residual shift sensor D in a fourth chart 415. The values for each of the residuals are fed as inputs to the respective membership functions giving output likelihood values of 0.6, 1.0, 0.85 and 0.5 in the same order. The final fault match likelihood is then calculated by using a straight averaging function of the four sensor values as set forth below:

$$L(\text{Fault Type } I)=(0.6+1.0+0.85+0.5)/4=0.74.$$

Figure 5:
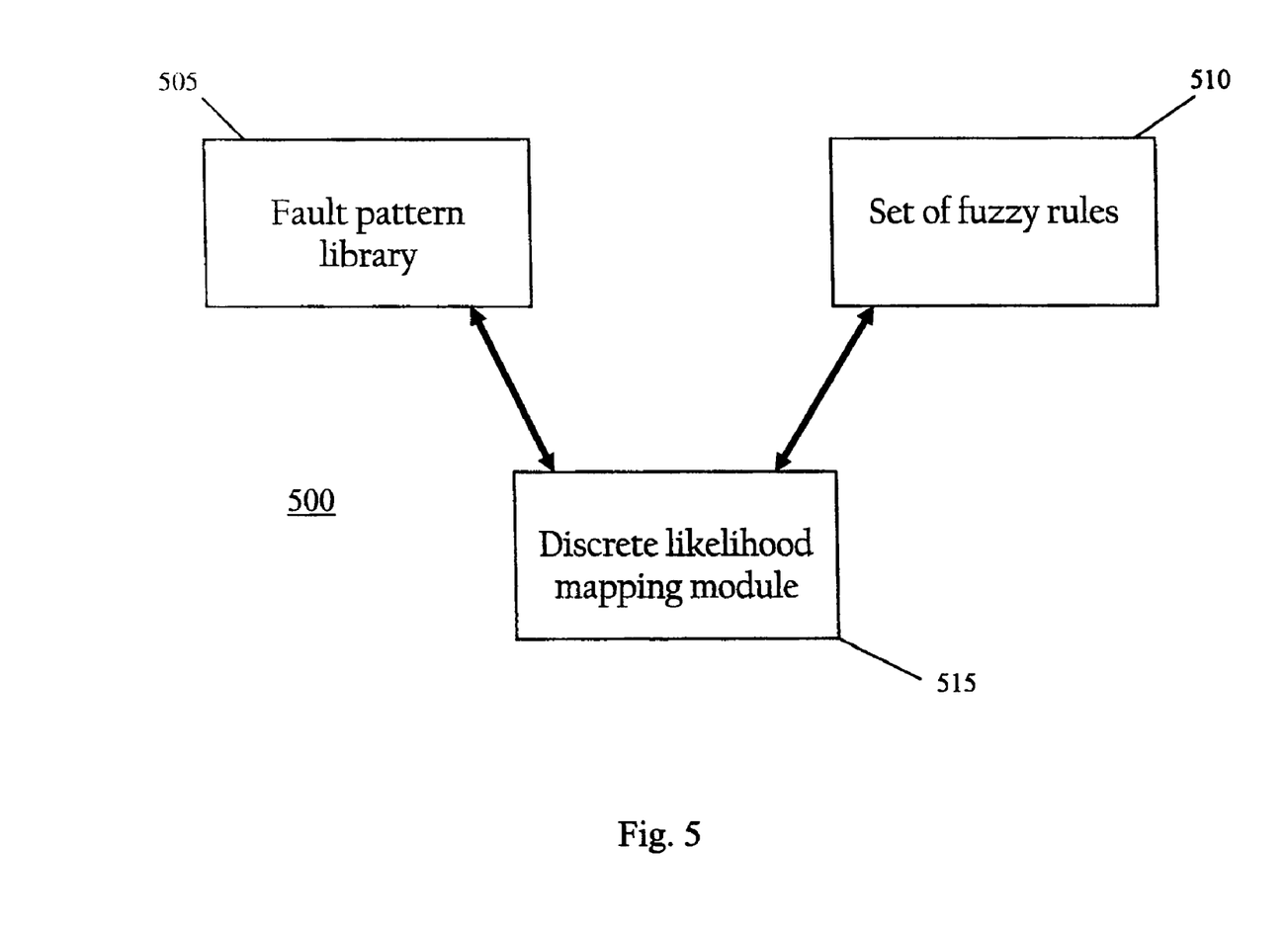
FIG. 5 illustrates a fault pattern matching system according to an embodiment of the invention.

FIG. 5 illustrates a fault pattern matching system 500 according to an embodiment of the invention. As shown, the fault pattern matching system 500 has three main components: a fault pattern library 505, a set of fuzzy rules 510 associated with the patterns in the fault pattern library 505, and a discrete likelihood mapping module 515. The fault pattern library 505 defines the fault characteristics in terms of residual shifts and other supporting diagnostic information. Fuzzy rules are defined based on the patterns of residual shifts defined in predetermined fault tables, such as Table 2 discussed below. The fault pattern match likelihood values are mapped to a set of discrete likelihood indices, which ultimately drive fault notification.

The fault pattern library 505 for an asset is the foundation for the fault pattern matching approach discussed herein. The fault pattern library 505 consists of a list of fault types along with their respective fault characteristics. In an embodiment of the invention, residual shifts are characterized using six fuzzy descriptors:

1. POS—positive residual shift
2. NEG—negative residual shift
3. NORM—no positive or negative shift in the residual
4. NOT POS—no positive shift in the residual
5. NOT NEG—no negative shift in the residual
6. NOT NORM—positive or negative shift in the residual Although only six fuzzy descriptors are listed above, it should be appreciated that more or fewer than six descriptors may be utilized in other embodiments. Along with these descriptors, supporting information can be combined logically with the fuzzy rules to narrow down the fault type possibilities. Such supporting information typically takes the form of logical tests (rules) applied to sensor or calculated variable data. For example, the statement "is the emergency valve open AND is the plant running" can be encoded as a logical test on the emergency valve position sensor and a logical test on the calculated plant power parameter.

In order to implement fuzzy rules that capture the relevant information included in a fault signature, six membership functions are defined. These six membership functions are the mathematical equivalent of the six fuzzy descriptors listed above.

Figure 6:
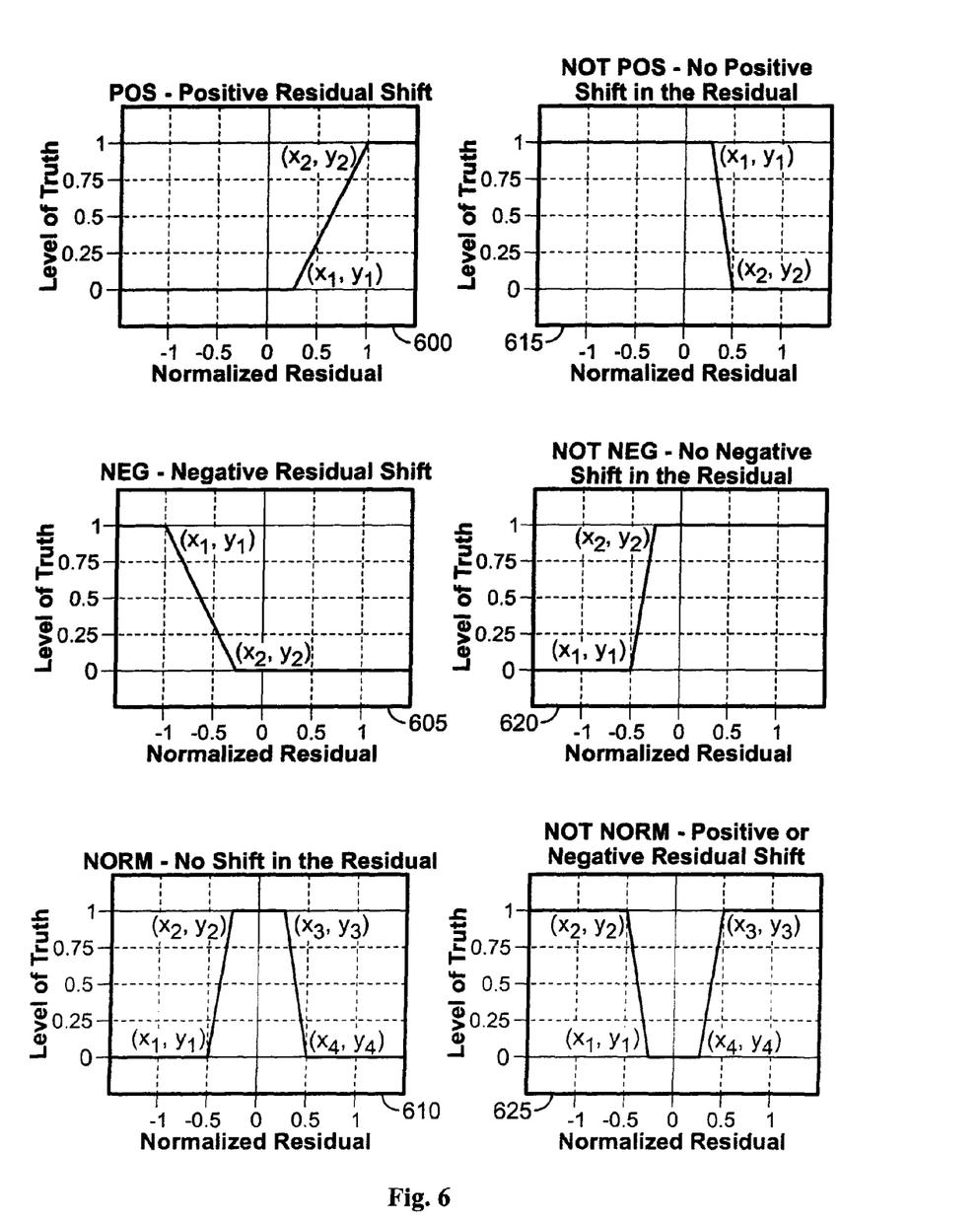
FIG. 6 illustrates charts corresponding to each of the membership function equations according to an embodiment of the invention.

Each MF is defined by a piecewise linear function as shown in equations 1 through 6 discussed below. FIG. 6 illustrates charts corresponding to each of the equations according to an embodiment of the invention. The x and y pairs correspond to the vertices at which the linear pieces of the functions are connected to each other. Each equation is accompanied by a plot of the corresponding MF with vertices labeled appropriately. In all cases, r represents a single normalized residual sample.

The first equation defines a Positive Residual Shift MF (POS): $x_1=0.25$, $y_1=0$, $X_2=1$, $y_2=1$.

$$f_P(r) = \begin{cases} 0, & r < x_1 \\ \frac{(y_2-y_1)}{(x_2-x_1)}(r-x_1)+y_1, & x_1 \le r \le x_2 \\ 1, & r > x_2 \end{cases}$$

The first equation is graphically illustrated in the first chart 600 of FIG. 6.

The second equation defines a Negative Residual Shift MF (NEG): $x1=-1$, $y1=1$, $x2=-0.25$, $y2=0$.

$$f_n(r) = \begin{cases} 1, & r < x_1 \\ \frac{(y_2-y_1)}{(x_2-x_1)}(r-x_1)+y_1, & x_1 \le r \le x_2 \\ 0, & r > x_2 \end{cases}$$

The second equation is graphically illustrated in the second chart 605 of FIG. 6.

The third equation defines a No Positive or Negative Shift in the Residual MF (NORM): $x1=-0.5$, $y1=0$, $x2=-0.25$, $y2=1$, $x3=0.25$, $y3=1$, $x4=0.5$, $y4=0$.

$$f_{no}(r) = \begin{cases} 0, & r < x_1 \\ \frac{(y_2 - y_1)}{(x_2 - x_1)}(r - x_1) + y_1, & x_1 \leq r < x_2 \\ 1, & x_2 \leq r < x_3 \\ \frac{(y_4 - y_3)}{(x_4 - x_3)}(r - x_3) + y_3, & x_3 \leq r < x_4 \\ 0, & x_4 \leq r \end{cases}$$

The third equation is graphically illustrated in the third chart 610 of FIG. 6.

The fourth equation defines a No Positive Shift in the Residual MF (NOT POS): x1=0.25, y1=1, x2=0.5, y2=0.

$$f_{np}(r) = \begin{cases} 1, & r < x_1 \\ \frac{(y_2 - y_1)}{(x_2 - x_1)}(r - x_1) + y_1, & x_1 \leq r \leq x_2 \\ 0, & r > x_2 \end{cases}$$

The fourth equation is graphically illustrated in the fourth chart 615 of FIG. 6.

The fifth equation defines a No Negative Shift in the Residual MF (NOT NEG): x1=−0.5, y1=0, x2=−0.25, y2=1.

$$f_{nn}(r) = \begin{cases} 0, & r < x_1 \\ \frac{(y_2 - y_1)}{(x_2 - x_1)}(r - x_1) + y_1, & x_1 \leq r \leq x_2 \\ 1, & r > x_2 \end{cases}$$

The fifth equation is graphically illustrated in the fifth chart 620 of FIG. 6.

The sixth equation defines a Positive or Negative Shift in the Residual MF (NOT NORM): x1=−0.5, y=1, x2=−0.25, y2=0, x3=0.25, y3=0, x4=0.5, y4=1.

$$f_{nno}(r) = \begin{cases} 1, & r < x_1 \\ \frac{(y_2 - y_1)}{(x_2 - x_1)}(r - x_1) + y_1, & x_1 \leq r < x_2 \\ 0, & x_2 \leq r < x_3 \\ \frac{(y_4 - y_3)}{(x_4 - x_3)}(r - x_3) + y_3, & x_3 \leq r < x_4 \\ 1, & x_4 \leq r \end{cases}$$

The sixth equation is graphically illustrated in the sixth chart 625 of FIG. 6.

The primary components of a fuzzy rule are typically composed of logical tests that utilize the Positive Residual Shift MF and the Negative Residual Shift MF above. Secondary components generally utilize the No Positive or Negative Shift in the Residual MF, No Positive Shift in the Residual MF, No Negative Shift in the Residual MF and Positive or Negative Shift in the Residual MF. In any case, the actual definitions of the MFs remain unchanged regardless of the application or scale of the raw residual. The MFs treat every residual exactly the same regardless of the raw residual statistics. This is feasible only when all residuals are scaled so that a residual value of 1.0 corresponds to an un-scaled residual value equal to the user specified residual threshold. Furthermore, because the user specified positive and negative residual thresholds are not necessarily symmetric around 0, the residual needs to be scaled differently depending on whether the residual is positive or negative.

Figure 7:
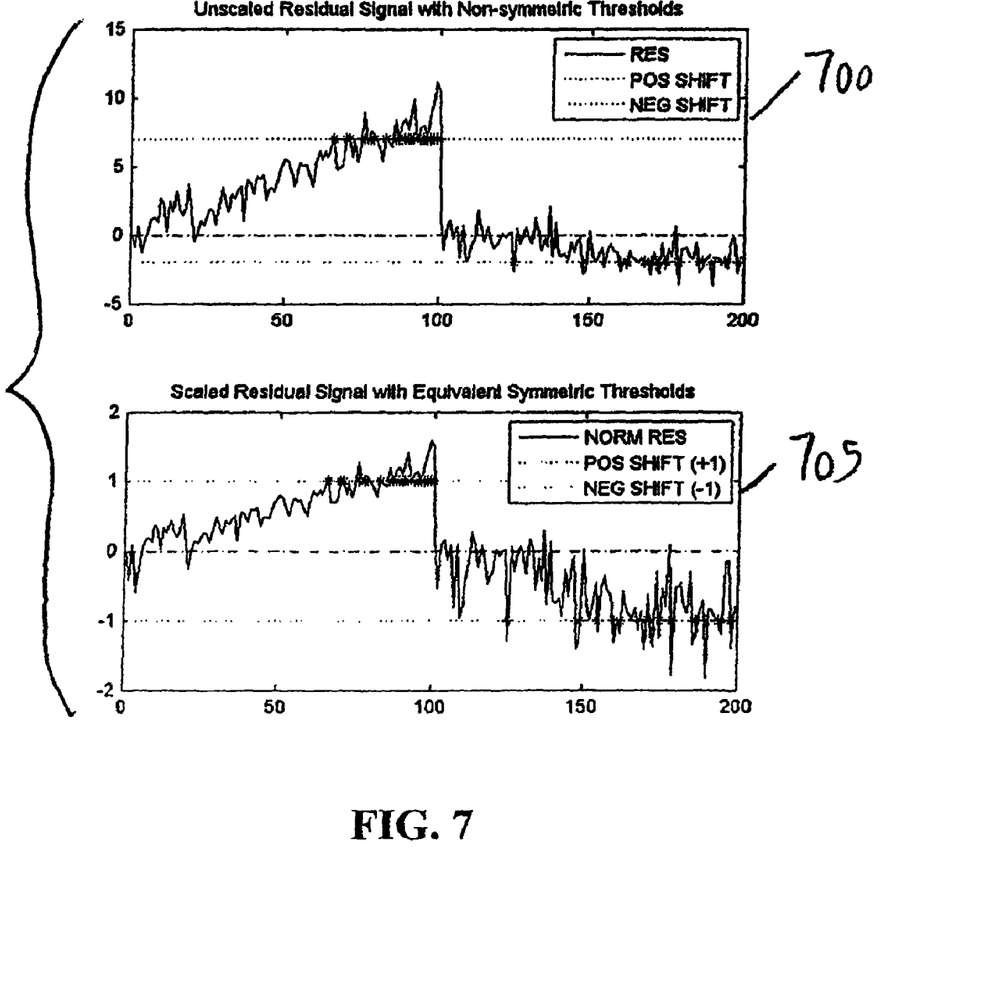
FIG. 7 illustrates both an unscaled residual signal and a scaled residual signal according to an embodiment of the invention.

FIG. 7 illustrates both an unscaled residual signal and a scaled residual signal according to an embodiment of the invention. In a first chart 700, a raw residual signal is tested against a positive threshold of 7.0 and a negative threshold of −2.0. The signal shown in the first chart 700 is then normalized and shown in the second chart 705.

In order to map the residual to equivalent threshold values of 1.0 and −1.0 respectively, the residual shown in the first chart 700 is scaled by ⅐ when positive and ½ when negative. After this scaling process, the two sets of thresholds are equivalent.

The same scaling process is used to normalize the residuals before evaluating the 5 membership functions so that the MFs never need to change (assuming the definitions of the functions stay the same). The same process follows if the residual is smoothed or unsmoothed.

The outputs from multiple MFs may be combined using a weighted average according to some embodiments. This is because in some applications it may be necessary to weight the outputs of the MFs differently depending on the significance of the sensor involved in the fault pattern. In applications in which all of the outputs are treated equally, the weighted average reduces to the straight average. If a fuzzy rule composed of N membership function outputs $f_i(r_i)$ and a set of weights for each output given by $w=[w_1, W_2, W_3, \ldots, W_N]$, the combined fuzzy output is then, $$L(r) = \frac{\sum_{i=1}^{N} f_i(r_i) w_i}{\sum_{i=1}^{N} w_i}$$

L(r) is the "likelihood" or level of truth that the fuzzy rule (pattern) has been matched and $r=[r_1, r_2, r_3, \ldots, r_N]$ is a vector of residual values at an instant in time. If all of the $w_i$'s are equal ($w=[w_1, W_2, W_3, \ldots, W_N]$), L(r) is equivalent to the straight average.

$$L(r) = \frac{\sum_{i=1}^{N} f_i(r_i) w_i}{\sum_{i=1}^{N} w_i} = \frac{w \sum_{i=1}^{N} f_i(r_i)}{Nw} = \frac{\sum_{i=1}^{N} f_i(r_i)}{N}$$

Some fault patterns are composed of two sets of fuzzy rule components, a primary and secondary set. First, the primary components are tested, producing a primary likelihood value $L_p(r_p)$ based only on the primary residuals $r_p$. If $L_p(r_p)$ is above some threshold $T_p$, the secondary components are tested producing a secondary likelihood value $L_s(r_s)$ based solely on the secondary residuals $r_s$. The final likelihood value, L(r), for the fault pattern match is either:

1. the primary likelihood $L_p(r_p)$, if it is below the threshold $T_p$; or
2. a combination of the secondary and primary likelihood values.

Once again, in case 2 there are a number of ways to combine $L_p(r_p)$ and $L_s(r_s)$. The weighted average is the preferred methodology in some embodiments. L(r) would then be calculated using an averaging equation with $f_1(r_1)$ and $f_2(r_2)$ replaced by $L_p(r_p)$ and $L_s(r_s)$ respectively, and N=2.

The final likelihood value (L(r)) tends to vary randomly from sample to sample due to the noise in the residual signals and the shape of the membership functions. Because of this, it is sometimes necessary to smooth L(r) before assessing the final likelihood that a fault pattern has been matched. The window size for a filter can be specified by the user but is typically on the order of 50 samples. Smoothing reduces spurious decision-making at the expense of introducing a delay in the decision.

TABLE 2

| FAULT TYPE | DT | TTD | DCA | DRN VLV POS | FWL | EMERGENCY DRN VLV POS |
|---|---|---|---|---|---|---|
| Tube Fouling | NEG | NEG | POS | | | NORM |
| Level Increase | NEG | POS | NEG | | | |
| Level Decrease | POS | NEG | POS | | | |
| Inadequate Venting | NEG | POS | NEG | | | |
| Tube Leak | NEG | POS | NEG | | | POS |
| Excessive Flow | NEG | POS | NEG | | | |
| Plugged Tubes | NEG | POS | POS | | | |
| Partition Plate Leak | NEG | POS | | | | |

Table 2 illustrates an example of a Fault Pattern library for a feed water heater. The filled cells correspond to the sensor residuals that are involved in the fuzzy fault pattern matching process. The non-filled cells contain supporting information that is logically combined with the fuzzy pattern matching output. The residual components used for fuzzy pattern matching are further broken into primary and secondary contributors. The lighter filled cells (e.g., the cells in the "DT" column) correspond to the primary components and the darker filled cells (e.g., the cells in the "FWL" column) correspond to the secondary components. A fuzzy rule is defined by a row in Table 2. For example, the fuzzy rule for determining whether a fault type is "Tube Fouling" is defined on the basis of the residuals for the variables DT, TTD, DCA, DRN VLV POS, and FWL, as discussed below. Empty cells indicate that the sensor residuals are not involved in the fuzzy pattern matching process or that no supporting information is logically combined with the pattern matching output.

The secondary components are only incorporated into the fuzzy rule if the primary components match their portion of the pattern with a pre-specified likelihood. This is performed because the supporting components can have the same characteristics when both a fault exists and when everything is normal. Without this scheme in place, the secondary components would potentially match part of the fault pattern regardless of the presence of a fault, which results in a non-zero likelihood value during normal operation.

The variables shown in Table 2 are determined based on some power industry knowledge, and more specifically, underlying expert knowledge. In this case, it is knowledge of a feed water heater. Feed water heaters are systems that extract thermal energy from a hot fluid and transfer it to a cold fluid. The feed water heater is essentially a hollow cylinder embedded with a series of tubes that traverse the inside of the cylinder. Cold liquid flows within the tubes while hot liquid flows outside of the tubes in the "shell region" of the feed water heater.

The first fault type listed in Table 2 is "Tube Fouling." One of the problems that can occur with the feed water heater is that particulates within the cold fluid can accumulate and cause some of the tubes within the feed water heater to become plugged, causing the fluid pressure to drop and the amount of cold fluid flow to decrease. One of the ways that this type of fault can be detected is by examining a number of parameters that are measured across this asset.

The first column to the right of the "Fault Type" column of Table 2 lists a change in temperature residual, or delta temperature (denoted as "DT" in Table 2). DT is a calculated variable that measures the change in the temperature of the cold fluid (i.e., the feed water) from the outlet of the feed water heater to the inlet. In the event that a Tube Fouling fault occurs, the DT residual would be negative (denoted by "NEG") in Table 2. In other words, in order for the first fuzzy rule to apply (i.e., the Tube Fouling fuzzy rule), there would have to be a decrease in the actual value of the DT variable relative to the expected/predicted value of the DT variable. In the system there will always be a temperature change from the inlet to the outlet because of the heat transfer discussed above. However, the parameters in Table 2 relate to residuals. The DT parameter is negative if the change in temperature is less than what would be predicted or expected. Much information about a feed water heater is known ahead of time and a determination of what the temperature change should be can be predicted based on measurements of other plant parameters. In the event that the actual temperature change differs from the predicted change, and there is therefore a change in the DT residual, that change can be used within the fuzzy classification framework to help to predict whether a designated fault is likely to occur.

Another calculated variable whose residual is tested within the fuzzy classification framework is the "terminal temperature difference" (denoted as "TTD"). The TTD variable is the difference between the temperature of the hot fluid (typically steam) as it enters the feed water heater and the temperature of the cold fluid (feed water) as it exits the feed water heater. As shown in Table 2, the fuzzy rule for the Tube Fouling fault requires the TTD residual to be NEG, i.e., for the actual value for the TTD variable to be less than what is predicted by the model.

Another calculated variable whose residual is tested within the fuzzy classification framework is the "drain cooler approach" (denoted as "DCA"). The DCA variable is the difference between the temperature of the hot fluid as it exits the feed water heater and the temperature of the cold fluid as it enters the feed water heater. As shown in Table 2, the fuzzy rule for the Tube Fouling fault requires the DCA residual to be POS, i.e., for the actual value for the TTD variable to be greater than what is predicted by the model.

The first three variables shown in Table 2 are all primary parameters. In the event that DT is NEG to some degree, TTD is NEG to some degree, and DCA is POS to some degree, the system determines that the there is some likelihood that a Tube Fouling fault has occurred.

Table 2 also includes several secondary parameters, shown in the columns to the right of DCA. For the Tube Fouling fault, the system first examines the three primary parameters, and if the combined fuzzy likelihood from these three are above the primary likelihood threshold as described above, then the secondary parameters are considered. In the Tube Fouling fault signature, two secondary parameters are tested. These are the "Drain Valve Position" ("DRN VLV POS") and the "Feed Water Level" ("FWL"). Both of these parameters are commonly monitored by sensors, with the DRN VLV POS sensor measuring the relative opening in the valve that controls the rate of flow of hot fluid exiting the feed water heater and the FWL sensor measuring the location of the steam/water interface within the shell region of the feed water heater. The fuzzy rule for the Tube Fouling fault requires that these two secondary parameters do not exhibit a positive or negative shift in their residual values ("NORM"). The NORM condition means that the measurement for a parameter does not vary significantly from the predicted value for the parameter, and is thus operating normally within the context of the model.

The last column in Table 2 contains a parameter, "Emergency Drain Valve Position" ("EMERGENCY DRN VLV POS"), that provides supporting information. The emergency drain is activated by the plant control system in the event that too much condensed steam builds up in the shell region of the feed water heater. During normal operation, the emergency drain valve is closed. The valve is typically opened only during emergency situations. The emergency drain valve position parameter is treated as supporting information because a sensor that monitors the valve position is often not connected to the plant's data acquisition system. If measurements from the EMERGENCY DRN VLV POS sensor are available, a crisp rule for it can be logically combined with the fuzzy pattern matching output to increase the confidence of the fuzzy rules. In the context of the fuzzy rule for the Tube Fouling fault, the position of the emergency drain valve is checked to see whether it has changed. If the position has not changed ("NORM"), meaning the valve remains closed as during normal operation, then the likelihood of fuzzy logic value for the Tube Fouling fault can be increased by a predefined amount. In some embodiments, the supporting information can be utilized by including the position of the emergency drain in a notification message.

Accordingly, as discussed above, there is a designated order or hierarchy in which parameters are evaluated according to a fuzzy rule. According to this designated order, the primary parameters are initially evaluated. In a preferred embodiment, the secondary parameters are evaluated only in the event that the combined fuzzy likelihood from the primary parameters is above the primary likelihood threshold. Finally, the fuzzy logic value created by combining the primary and secondary fuzzy logic values as described above provides a measure of the likelihood that the corresponding fault has been satisfied by the various parameters.

It should be appreciated that in some embodiments, more or fewer than three primary parameters are utilized as a fuzzy logic rule. Moreover, some of the fuzzy logic rules for certain faults may include two primary parameters, whereas other of the fuzzy logic rules may include one or more than two primary parameters. There may also be multiple secondary levels of parameters. The various sensors providing the residuals being analyzed may provide a substantial amount of data over time. A computationally efficient fault detection system can be realized by analyzing the fuzzy rules in this hierarchical manner.

As shown in Table 2, there are some types of faults for which the primary parameter values are the same, such as "Inadequate Venting," "Tube Leak," and "Excessive Flow." The primary parameter values for DT are NEG, for TTD are POS, and for DCA are NEG for each of these types of faults. For these faults, the secondary parameters are utilized to differentiate between these types of faults.

There are additional types of faults that are also defined by fuzzy logic rules, such as "Level Increase," "Level Decrease," "Inadequate Venting," "Plugged Tubes," and "Partition Plate Leak."

It should also be appreciated that in some embodiments, not all of the residual data is required in order to satisfy a fuzzy logic rule. For example, in the event that one of the sensors utilized by the calculated variable providing the TTD measurements is broken or malfunctioning, the system may not be able to obtain a TTD residual. In such events, the other parameters shown in Table 2 may still be utilized to determine whether a fault exists and to characterize the fault. However, it should be appreciated that there may be a limit as to the number of sensor readings can be omitted while still accurately detecting and characterizing faults. In some embodiments, residuals for all of the primary parameters must be present, but residuals for some of the secondary parameters may be missing and the system can still detect and characterize the fault.

In the event that two or more fuzzy logic rules have the same residual requirements for available sensor data, but residual data is missing for an additional parameter, the system might be able to determine, for example, two possible faults, but may not be able to determine which is more likely to occur. For example, for the "Level Increase" and the "Inadequate Venting" faults, the DT, TTD, DCA, and DRN VLV POS residual values are identical. The FWL secondary parameter residual can be used to differentiate between these faults.

The fuzzy rules are utilized to detect or predict a possible impending fault and send a notification message to an analyst to check on certain components of the systems that may have potential problems. The system effectively receives a given set of information from a point in time that is based on the fault modeling and in sensor measurements. The fuzzy patterns are tested, and each one returns with a fuzzy truth value that can vary from 0 to 1. If a certain subset in these conditions is met, then the user is notified that there is a developing problem that is a change from normality and the fuzzy pattern indicates which problem is most likely. The user could be notified of other possible causes for the problem because fuzzy truth values are computed for multiple fuzzy rules.

The various POS, NEG and NOT NEG fuzzy criteria shown in Table 2 are evaluated for a level of truth. In other words, if the value of a parameter, such as DT is decreasing, or NEG, a value can be assigned to encapsulate how much the DT parameter is decreasing. In other words, a fuzzy value is assigned to the measurement of the DT parameter. Fuzzy values are assigned to the other measured residuals as well and the combination of the fuzzy values in the hierarchal manner described above is used to indicate the likelihood that a particular designated fault is occurring.

The rules of Table 2 are evaluated online, and if certain conditions are met, a user is notified of an incipient fault. The identity of the incipient fault is determined based upon how closed a measured pattern of residuals from various sensors and calculated variables matches a pre-determined fuzzy rule.

Once the system determines that there is a strong likelihood that it is a Tube Fouling fault that is incipient, an analyst/user monitoring the system is notified. The system advises the analyst that something is developing; it will inform the analyst that the residuals fit the Tube Fouling fault or some other fault pattern, and instruct the analyst to check on the feed water system.

Figure 8:
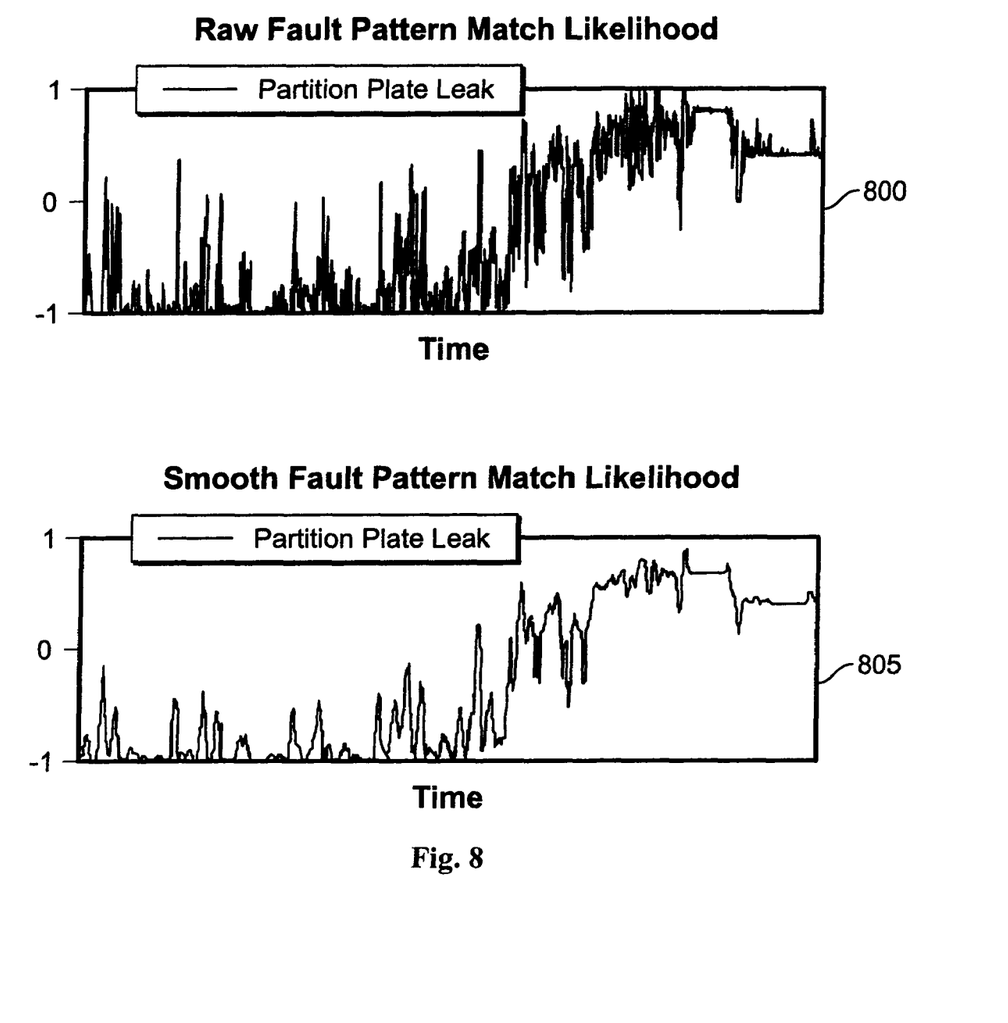
FIG. 8 illustrates raw and smoothed versions of the fault pattern match likelihood for a Partition Plate Leak in a Feedwater Heater according to an embodiment of the invention.

FIG. 8 illustrates raw and smoothed versions of the fault pattern match likelihood for a Partition Plate Leak in a Feedwater Heater according to an embodiment of the invention. The raw fault pattern match likelihood is illustrated in a first chart 800, and the smoothed fault pattern match likelihood is illustrated in a second chart 805. The smoothing provides a more consistent output over time and makes persistence easier to assess as well.

The overall fuzzy likelihood value for each fault pattern is mapped into a set of 5 discrete levels of likelihood in order to drive end user notification. Here "likelihood" is analogous to what historically has been called "confidence." The mapping is accomplished by assigning different likelihood ranges to a fuzzy descriptor set, i.e. "very low", "low", "medium", "high" and "very high." Here, "low" is interpreted as "the likelihood is 'low' that the fault pattern is matched." The other descriptors are interpreted in an analogous fashion.

The range of the fuzzy likelihood values varies from 0 to 1. However, for convenience, when and if the user actually sees the likelihood values they are scaled to be between 0 and 100%. The mapping to the fuzzy descriptors uses the 0 to 100% values as well. Converting likelihood values to the 0 to 100% range makes the mapping process less abstract. Table 3 shows an example of mapping rescaled fuzzy likelihood values ("L") to the set of fuzzy descriptors.

TABLE 3

Fuzzy Likelihood Mapping

| Likelihood Range (%) | Fuzzy Likelihood |
|---|---|
| 0 <= L < 50 | Very low |
| 50 <= L < 70 | Low |
| 70 <= L < 80 | Medium |
| 80 <= L < 90 | High |
| 90 <= L <= 100 | Very High |

In the event that a likelihood of a fault is detected, a user is notified in accordance with the fuzzy likelihood shown above in Table 3. The notification process (determining when an automated message (email) will be generated by the system) to the end user is driven by a subscription process. The user subscribes notification at a specific likelihood range for each fault pattern, receiving notification of pattern matches at that range and all higher ranges. For instance, if the user subscribes to the Tube Fouling fault at the 70% to 80% likelihood range, the user will receive notification for that fault at all medium, high and very high pattern matches.

Figure 9:
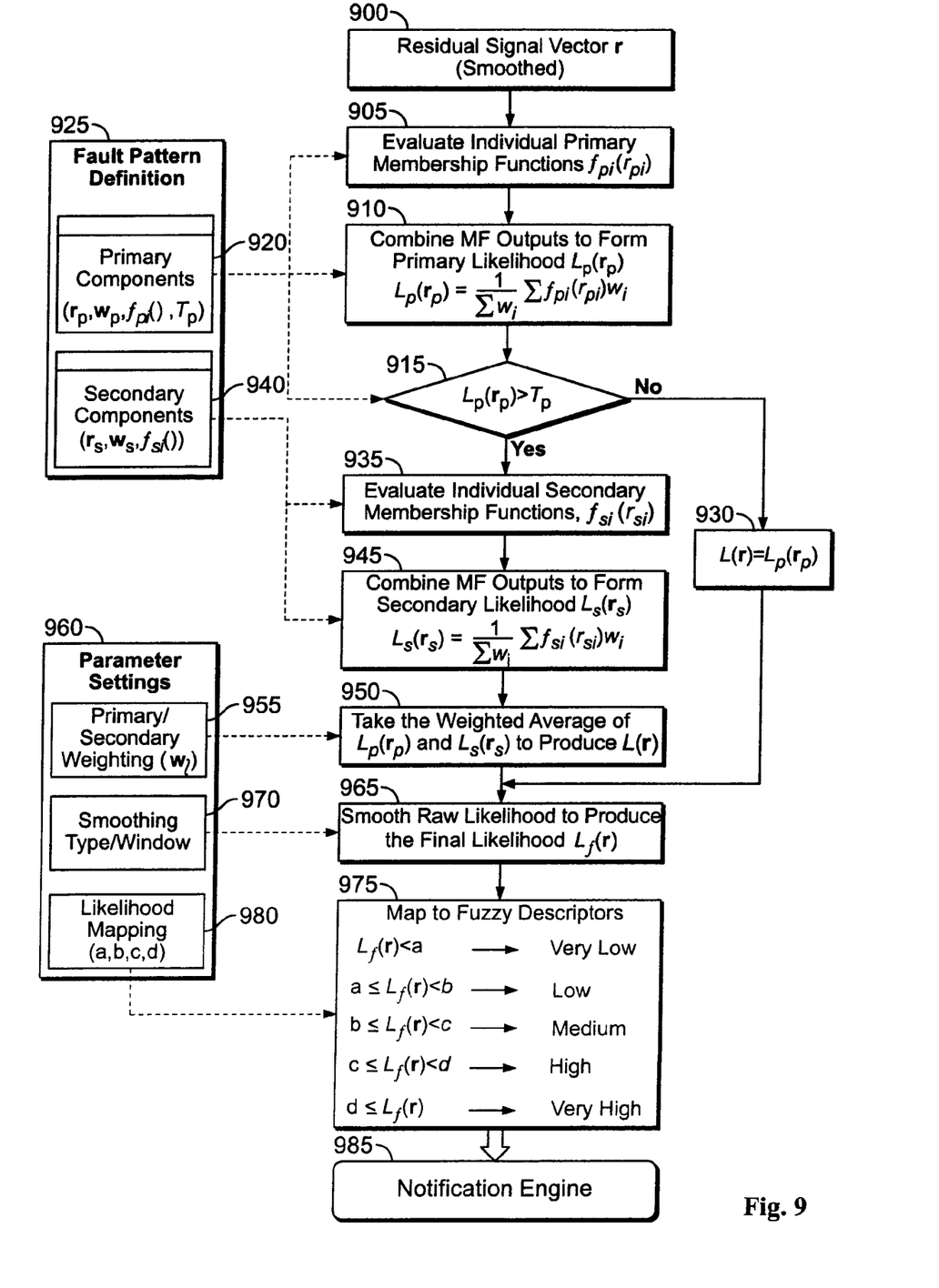
FIG. 9 illustrates a flow diagram of the fuzzy logic Signal Based Modeling method according to an embodiment of the invention.

FIG. 9 illustrates a flow diagram of the fuzzy logic SBM method according to an embodiment of the invention. First, at operation 900, a residual signal vector r is received and smoothed. The residual vector r may be the residual signal from any of the sensors. The vector is smoothed to minimize the effects of noise spikes in the residual signal. Next, at operation 905, the primary membership functions (MF) $f_p(r_p)$ are evaluated. The primary components 920 of the fault pattern definition 925, such as those discussed above with respect to Table 2, are utilized in this operation. Next, the primary MF outputs are combined in a weighted averaging operation 910 to form a primary likelihood value $L_p(r_p)$. Next, a determination is made at operation 915 as to whether the primary likelihood value $L_p(r_p)$ exceeds a threshold value, $T_p$. If "no," processing proceeds to operation 930, the likelihood of a particular fault is set to the value of $L_p(r_p)$, and processing proceeds to operation 965.

If "yes," on the other hand at operation 915, processing proceeds to operation 935, at which point the individual secondary membership functions $f_s(r_s)$ are evaluated. The secondary membership functions utilize the secondary components 940 of the fault pattern definition 925. Next, at operation 945, the MF outputs are combined in a weighted averaging operation to form a secondary likelihood $L_s(r_s)$. The weighted average of $L_p(r_p)$ and $L_s(r_s)$ is then computed to produce L(r) at operation 950. In determining the weighted average, a primary/secondary weighting $W_L$ 955 stored in parameter settings 960 is utilized.

L(r) is subsequently smoothed at operation 965 to produce a Final Likelihood $L_f(r)$. A smoothing type window 970 is utilized in this operation. The Final Likelihood $L_f(r)$ is then mapped to predefined fuzzy descriptors at operation 975 according to a likelihood mapping 980 of the parameter settings 960. In the event that $L_f(r) < a$, a first threshold value, a "very low" descriptor is assigned to $L_f(r)$. If, on the other hand, $a \leq L_f(r) < b$, a second threshold value, a "low" descriptor is assigned to $L_f(r)$. In the event that $b \leq L_f(r) < c$, a third threshold value, a "medium" descriptor is assigned to $L_f(r)$. In the event that $c \leq L_f(r) < d$, a fourth threshold value, a "high" descriptor is assigned to $L_f(r)$. Finally, in the event that $d \leq L_f(r)$, a "very high" descriptor is assigned to $L_f(r)$. Finally, the descriptor is sent to a notification engine 985. The assigned descriptor indicates the manner in which the notification engine is to notify the appropriate party of an impending fault.

The system described herein utilizes a fuzzy logic classification approach to fault pattern matching. A system is monitored by a set of sensors. Calculated variables can be used to combine measurements from various sensors into new measurements. The measurements for each sensor and calculated variable included in a model are compared against predicted values produced by the model. The residual values for each of the sensors and calculated variables are determined.

The fuzzy rules are utilized to detect or predict a possible incipient fault and send a notification message to an analyst to check on certain components of the systems that may have potential problems. The system effectively receives a given set of information from a point in time that is based on sensor measurements and modeling results. The fuzzy patterns are tested, and each one returns with a fuzzy truth value that can vary from 0% to 100%. If the fuzzy truth value for a fault pattern falls within or above a specified range of likelihood values, then the user is notified that there may be a developing problem that matches a fuzzy pattern at an indicated fuzzy descriptor level. The system can also notify the user that the plant conditions match other faults since likelihood values are computed for multiple fuzzy rules.

As mentioned previously, a first notification may issue when primary parameters indicate a fault, and a second or further notifications may issue when secondary or other parameters indicate a fault. These notifications may repeat the same message or may be different, such as increase in urgency language for example. The notifications may issue to the same or different parties as desired and depending on the level (primary, secondary, etc.) of the notification.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of diagnosing faults in a monitored system, comprising:
generating estimates of parameter data for parameters monitored on the monitored system by using reference parameter data characteristic of known behavior of the system;
comparing the generated estimates of the parameter data with measured parameter data;
determining a residual for each of the parameters based on a relationship between the generated estimates of the parameter data and the measured parameter data; and
implementing at least one fuzzy classification rule to determine a likelihood that a predetermined fault exists, the fuzzy classification rules using residuals of parameters used to indicate the existence of the predetermined fault, and at least one membership function used to analyze the residuals and having the same abscissa and ordinate coordinates regardless of which parameter is being analyzed.

2. The method of claim 1 wherein the step of implementing fuzzy classification rules further comprises the step of selecting the fuzzy classification rule from a predetermined set of fuzzy classification rules that are used for all faults and all residuals.

3. The method of claim 1 wherein the at least one membership function determines the likelihood of the existence of a residual shift relative to at least one threshold for at least one parameter used to indicate the predetermined fault.

4. The method of claim 3 wherein the fuzzy classification rule includes a membership function that determines the likelihood of at least one of:
a positive residual shift,
a negative residual shift,
positive or negative residual shift,
no positive residual shift,
no negative residual shift, and
no positive or negative residual shift.

5. The method of claim 2 wherein the step of implementing fuzzy classification rules further comprises the steps of:
obtaining an output from each membership function for parameters used to indicate the predetermined fault; and
combining the outputs in a calculation to determine a single scalar fuzzy logic value.

6. The method of claim 1 further comprising the step of retrieving a fault pattern from a fault pattern library to determine which parameters are used to indicate the predetermined fault.

7. The method of claim 1, further comprising issuing a first notification in response to implementation of the fuzzy classification rules generating a fuzzy logic value exceeding a first threshold.

8. The method of claim 7 further comprising issuing at least one more notification in response to the implementation of the fuzzy classification rules generating the fuzzy logic value exceeding at least one other threshold.

9. The method of claim 1, further comprising the steps of:
implementing the fuzzy classification rule in accordance with a hierarchy of the reference parameter data and measured parameter data, including:
initially analyzing primary parameter data, and
analyzing secondary parameter data only in response to the primary parameter data corresponding to a portion of at least one fuzzy classification rule corresponding to the predetermined fault.

10. A monitoring apparatus for diagnosing faults in a system, comprising:
a reference library containing reference parameter data characteristic of known behavior of the system;
a fuzzy logic engine configured to:
generate estimates of parameter data from the system with reference parameter data characteristic of known behavior of the system;
compare the generated estimates of the parameter data with measured parameter data;
determine a residual for each of the parameters based on a relationship between the estimates of the parameter data and the measured parameter data; and
implement at least one fuzzy classification rule to determine a likelihood that a set of outputs corresponds to a predetermined fault, wherein the outputs are generated based on the residual for each of the parameters that corresponds to the predetermined fault and by using at least one membership function with abscissa and ordinate coordinates that remain the same regardless of which parameter is being analyzed.

11. The monitoring apparatus of claim 10, further comprising a notification engine to issue a first notification in response to implementation of the fuzzy classification rule generating a fuzzy logic value exceeding a first threshold.

12. The monitoring apparatus of claim 10, wherein the notification engine is adapted to issue at least one more notification in response to the implementation of the fuzzy classification rule generating the fuzzy logic value exceeding at least one other threshold.

13. The monitoring apparatus of claim 10, further comprising a processor to implement the fuzzy classification rule in accordance with a hierarchy of the reference parameter data and measured parameter data, wherein primary parameter data is initially analyzed, and secondary parameter data is analyzed only in response the primary parameter data corresponding to a portion of at least one fuzzy classification rule corresponding to the predetermined fault.

14. A monitoring apparatus for diagnosing faults in a system, comprising:
a real-time data processing module that provides residuals representing a relationship between generated estimates of parameter data, and measured parameter data, the generated estimates being based on reference parameter data characteristics of known behavior of the system;
a failure mode database that stores fault patterns that each indicate a predetermined fault;
a fuzzy pattern recognition module configured for:
receiving fault patterns from the failure mode database and residuals from the real-time data processing module,
implementing at least one fuzzy classification rule that uses the residuals to calculate a set of outputs and at least one membership function with abscissa and ordinate coordinates that remain the same regardless of which parameter is being analyzed,
determining if the outputs indicate a likelihood that the predetermined fault exists; and
a diagnosis and actions output module that acts depending on whether or not a predetermined fault is determined to exist and a classification of the fault.

15. The monitoring apparatus of claim 14 wherein the fuzzy pattern recognition module comprises a set of the membership functions associated with the fault patterns.

* * * * *